United States Patent [19]
Levosinski

[11] Patent Number: 5,346,252
[45] Date of Patent: Sep. 13, 1994

[54] INFLATOR AND METHOD OF ASSEMBLY

[75] Inventor: George J. Levosinski, Marine City, Mich.

[73] Assignee: TRW Vehicle Safety Systems Inc., Lyndhurst, Ohio

[21] Appl. No.: 25,445

[22] Filed: Mar. 2, 1993

[51] Int. Cl.$^5$ .................. B60R 21/26; B01D 29/50
[52] U.S. Cl. .................. 280/740; 55/485; 55/487; 280/741
[58] Field of Search .......... 280/736, 740, 741, 742; 55/485, 487; 102/530, 531; 422/164, 165, 166

[56] References Cited

U.S. PATENT DOCUMENTS

| | | | |
|---|---|---|---|
| 3,880,447 | 4/1975 | Thorn et al. | 280/736 |
| 4,012,211 | 3/1977 | Goetz | 280/740 |
| 4,817,828 | 4/1989 | Goetz | 280/736 |
| 4,877,527 | 10/1989 | Brownell | 55/487 |
| 4,923,212 | 5/1990 | Cuevas | 280/736 |
| 5,217,515 | 6/1993 | Guglielmi | 280/740 |
| 5,230,726 | 7/1993 | Smith et al. | 55/487 |

Primary Examiner—Margaret A. Focarino
Assistant Examiner—Peter English
Attorney, Agent, or Firm—Tarolli, Sundheim & Covell

[57] ABSTRACT

An inflator (14) for inflating an air bag (12) includes a source of gas (62) for inflating the air bag, and a tubular wall (52) with a plurality of gas flow openings (86) for directing the gas to flow from the inside of the tubular wall (52) toward the air bag (12). The inflator (14) also includes a rupturable pressure controlling member (60) and a cylindrical filter assembly (56) with a plenum screen (76). The pressure controlling member (60) extends circumferentially around the inside of the tubular wall (52) and across the gas flow openings (86) to block the gas from flowing into the gas flow openings (86). The cylindrical filter assembly (56) is located between the source of gas (62) and the pressure controlling member (60). The plenum screen (76) extends circumferentially around the inside of the pressure controlling member (60), and has an edge (180) adjoining the pressure controlling member (60). The edge (180) of the plenum screen (76) adjoining the pressure controlling member (60) is selvaged so that the edge (180) has a minimal tendency to rupture the pressure controlling member (60) during assembly of the filter assembly (56) into the tubular wall (52).

10 Claims, 4 Drawing Sheets

INFLATOR AND METHOD OF ASSEMBLY

BACKGROUND OF THE INVENTION

1. Field of the Invention

The present invention relates to an inflator for inflating a vehicle occupant restraint such as an air bag, and further relates to a method of assembling the inflator.

2. Description of the Prior Art

U.S. Pat. No. 4,817,828 discloses an inflator for inflating a vehicle occupant restraint such as an air bag. The inflator includes an inner tubular wall and an outer tubular wall. The inner tubular wall surrounds an ignitable gas generating material which, when ignited, rapidly produces a large volume of gas for inflating the air bag. Each of the tubular walls has a plurality of gas flow openings for directing the gas to flow radially outward from the gas generating material and through the tubular walls toward the air bag. A sheet of pressure controlling foil extends circumferentially around the inside surface of the outer tubular wall. The pressure controlling foil blocks the gas from flowing through the openings in the outer tubular wall until the pressure of the gas reaches a predetermined elevated level at which it ruptures the pressure controlling foil.

The inflator disclosed in the '828 patent further includes a cylindrical filter assembly. The filter assembly is located between the inner tubular wall and the outer tubular wall. The filter assembly has a plurality of generally cylindrical layers of filter material which remove unwanted products of combustion from the gas as the gas flows radially outward through the filter assembly. The radially outermost layer of filter material adjoins the sheet of pressure controlling foil, and is formed of coarse wire mesh screen with relatively large openings that define a plenum chamber. The gas accumulates within the inflator, including the plenum chamber, while the gas pressure is increasing toward the elevated level at which it ruptures the pressure controlling foil.

The inflator disclosed in the '828 patent is assembled by laying out flat, flexible sheets of filter material in overlying relationship with a flat, flexible sheet of wire mesh screen, and by winding the sheets around the inner tubular wall. The wound sheets then extend circumferentially around the inner tubular wall in spiral configurations, and thus define layers of the filter assembly which are generally coaxial and cylindrical. The layer of coarse wire mesh screen is then wrapped around the other layers. The filter assembly and the inner tubular wall are moved telescopically into the outer tubular wall through an open end of the outer tubular wall after the sheet of pressure controlling foil has been installed within the outer tubular wall.

SUMMARY OF THE INVENTION

In accordance with the present invention, an apparatus for inflating a vehicle occupant restraint, such as an air bag, comprises a source of gas for inflating the vehicle occupant restraint, a tubular wall, and a sheet of rupturable pressure controlling material. The tubular wall has a plurality of gas flow openings for directing the gas to flow from the inside of the tubular wall to the outside of the tubular wall. The sheet of rupturable pressure controlling material extends circumferentially around the inside of the tubular wall and across the gas flow openings. The sheet of rupturable pressure controlling material thus blocks the gas from flowing into the gas flow openings.

The apparatus further includes a cylindrical filter assembly. The filter assembly is located within the tubular wall between the source of gas and the sheet of rupturable pressure controlling material. The filter assembly includes a woven mesh plenum screen extending circumferentially around the inside of the sheet of rupturable pressure controlling material. The plenum screen has an edge adjoining the sheet of rupturable pressure controlling material. That edge of the plenum screen is a selvage comprising means for reducing the tendency of the plenum screen to rupture the sheet of rupturable pressure controlling material where the edge adjoins the sheet of rupturable pressure controlling material.

When the apparatus is assembled, the cylindrical filter assembly is moved telescopically into the tubular wall through an open end of the tubular wall. The woven mesh plenum screen is thus moved in sliding contact with the sheet of rupturable pressure controlling material. The tendency of the plenum screen to tear or puncture the sheet of rupturable pressure controlling material during assembly is minimized in accordance with the present invention because the ends of the woven strands in the plenum screen which slide against the pressure controlling member are formed into a selvage having no projecting sharp portions.

BRIEF DESCRIPTION OF THE DRAWINGS

The foregoing and other features of the present invention will become more apparent to one skilled in the art to which the present invention relates upon reading the following description of the invention in view of the accompanying drawings, in which.

DESCRIPTION OF A PREFERRED EMBODIMENT

Figure 1:
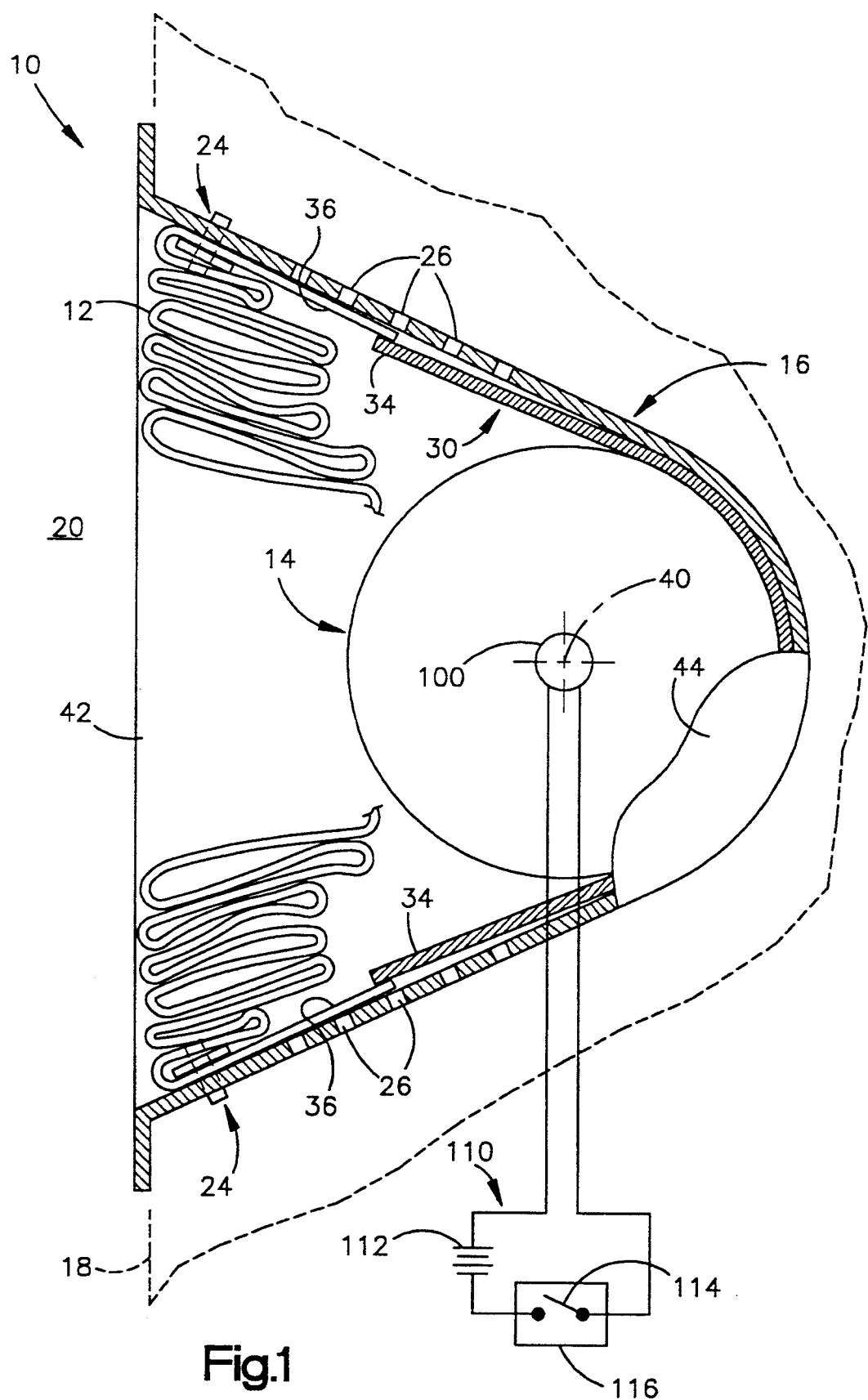
FIG. 1 is a schematic view of a vehicle occupant restraint apparatus constructed in accordance with the present invention.
Figure 2:
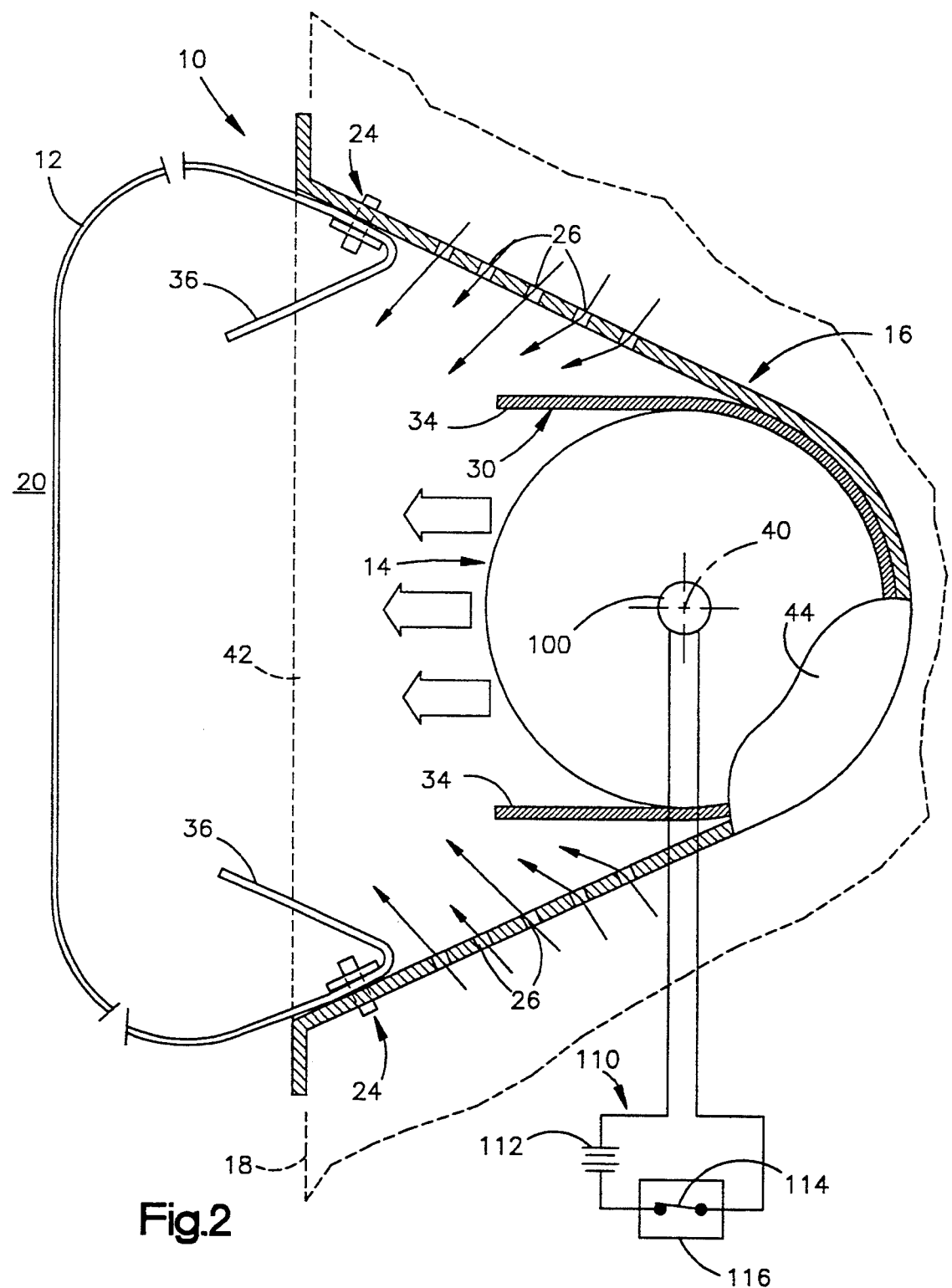
FIG. 2 is view of the apparatus of FIG. 1 in an actuated condition.

As shown schematically in FIGS. 1 and 2, a preferred embodiment of the present invention is a vehicle occupant restraint apparatus 10. The apparatus 10 includes an inflatable vehicle occupant restraint 12 which is commonly referred to as an air bag. The apparatus 10 further includes an inflator 14. The air bag 12 and the inflator 14 are housed in a reaction canister 16 which is mounted in the instrument panel 18 of a vehicle. The apparatus 10 has an unactuated condition in which the air bag 12 is stored in a folded condition, as shown in FIG. 1. The apparatus 10 also has an actuated condition in which the air bag 12 is inflated, as shown in FIG. 2. The apparatus 10 is actuated in response to vehicle deceleration indicative of a collision. The air bag 12 is inflated from the stored, folded condition to the inflated condition by a rapid flow of gas from the inflator 14. When the air bag 12 is in the inflated condition, it extends rearwardly from the reaction canister 16 into the vehicle occupant compartment 20 to restrain forward movement of a vehicle occupant toward the instrument panel 18.

The air bag 12 is connected to the reaction canister 16 by suitable clamping assemblies 24. The reaction canister 16 has a plurality of ambient air flow openings 20 located between the inflator 14 and the air bag 12. A sheet 30 of foil or the like provides a pair of flaps 34 extending from the inflator 14 over several of the ambient air flow openings 26. Additional flaps 36, which comprise edge portions of the air bag 12, extend from the clamping assemblies 24 over the remainder of the ambient air flow openings 26.

The inflator 14 has a cylindrical shape centered on an axis 40, and extends axially between two opposite side walls 42 and 44 of the reaction canister 16. As shown in greater detail in the longitudinal sectional view of FIG. 3, the inflator 14 includes a tubular cylindrical inner wall member 50 and a tubular cylindrical outer wall member 52. A cylindrical filter assembly 56 and a pressure controlling member 60 are located within the inflator 14 between the inner wall member 50 and the outer wall member 52.

The inner wall member 50 surrounds an ignitable gas generating material 62 which, when ignited, rapidly produces a large volume of gas for inflating the air bag 12. Such gas generating materials are known in the art. For example, an especially suitable gas generating material for use in the inflator 14 is disclosed in U.S. Pat. No. 4,817,828. The inner wall member 50 has a plurality of radially extending cylindrical surfaces 64 defining gas flow openings 66. The gas flow openings 66 direct the gas generated by the gas generating material 62 radially outward through the inner wall member 50 toward the filter assembly 56.

The filter assembly 56 has a plurality of layers of filter material including layers 70 of wire mesh screen, layers 72 of steel wool, and layers 74 of ceramic/glass wool. The layers of filter material further include a plenum layer which is formed by a wire mesh plenum screen 76. The plenum screen 76 extends circumferentially entirely around the immediately underlying layer 70 of wire mesh screen, and preferably has a mesh size such that openings through the plenum screen 76 are larger than the openings through any one of the underlying layers 70 of wire mesh screen. The openings through the plenum screen 76 define a plenum chamber 78 adjoining the immediately underlying layer 70 of wire mesh screen. The filter assembly 56 removes unwanted products of combustion, such as hot particles, from the gas generated by the gas generating material 62 as the gas moves radially outward through the filter assembly 56 from the inner wall member 50 toward the outer wall member 52.

The outer wall member 52 has a cylindrical inner side surface 80, a cylindrical outer side surface 82, and a plurality of radially extending cylindrical surfaces 84 which define gas flow openings 86 extending radially through the outer wall member 52. The pressure controlling member 60 is a rupturable sheet of metal foil which extends circumferentially around the inner side surface 80 of the outer wall member 52 in continuous contact with the inner side surface 80. The pressure controlling member 60 thus has a plurality of individual portions 90, each of which extends across the inner end of a respective one of the gas flow openings 86 in the outer wall member 52.

As further shown schematically in FIGS. 1 and 2, the inflator 14 also includes an igniter 100 for igniting the gas generating material 62. The igniter 100 is operatively connected to an electrical circuit 110. The electrical circuit 110 includes a power source 112, which is preferably the vehicle battery, and a normally open switch 114. The switch 114 is preferably part of a deceleration sensor 116. The deceleration sensor 116 senses deceleration of the vehicle which is indicative of a collision, and closes the switch 114 in response to such deceleration.

When the vehicle experiences a collision, the deceleration sensor 116 senses the deceleration that is caused by the collision and closes the switch 114. The igniter 100 is then actuated by the electrical circuit 110 and ignites the gas generating material 62.

When the gas generating material 62 is ignited by the igniter 100, it rapidly produces a large volume of gas which flows radially outward through the gas flow openings 66 in the inner wall member 50. The gas further flows radially outward through the filter assembly 56. As noted above, unwanted products of combustion are removed from the gas as the gas flows through the filter assembly 56. When the gas emerges from the radially outermost layer 70 of wire mesh screen in the filter assembly 56, it enters the plenum chamber 78 defined by the plenum screen 76, and moves radially through the plenum chamber 78 toward the pressure controlling member 60. However, the portions 90 of the pressure controlling member 60 initially block the gas from flowing into the gas flow openings 86 in the outer wall member 52. The gas then accumulates within the inflator 14 until the gas pressure increases to a predetermined elevated level. When the gas pressure within the inflator 14 reaches the predetermined elevated level, the portions 90 of the pressure controlling member 60 rupture under the influence of the gas pressure acting radially outward. The gas then flows rapidly outward through the gas flow openings 86.

As indicated schematically by the large arrows in FIG. 2, the gas flowing radially outward from the inflator 14 is directed rearwardly in the reaction canister 16 toward the air bag 12. This flow of gas causes a reduction in the gas pressure inside the reaction canister 16 adjacent to the flaps 34 and 36. The reduction in the gas pressure inside the reaction canister 16 causes ambient air outside the reaction canister 16 to flow inwardly through the ambient air flow openings 26 and past the flaps 34 and 36, as indicated schematically by the small arrows in FIG. 2. The ambient air mixes with the gas in the reaction canister 16 and cools the gas. The ambient air also augments the flow of the gas into the air bag 12, and thus reduces the amount of gas which must be generated by the gas generating material 62. The air bag 12 is fully inflated upon the occurrence of a vehicle collision.

Figure 4:
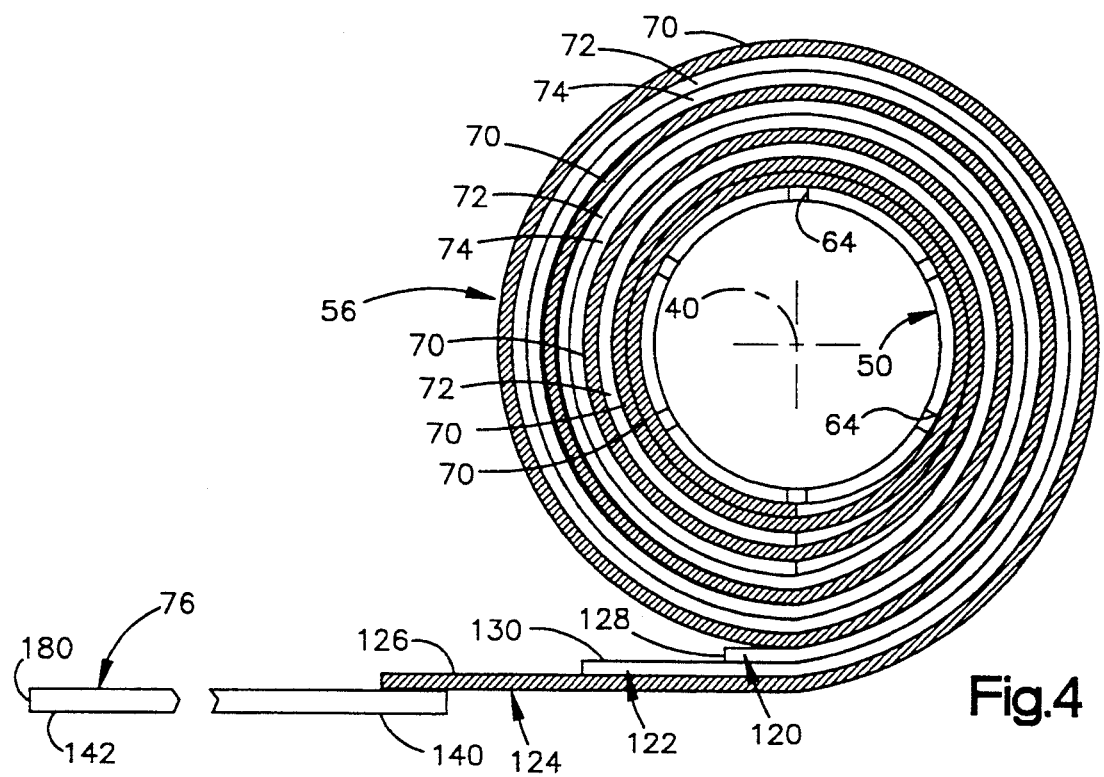
FIG. 4 is a schematic view of parts of the apparatus of FIG. 1 in a partially assembled condition.

The filter assembly 56 is shown schematically in FIG. 4 in a partially assembled condition. The filter assembly 56 is shown in FIG. 4 to comprise the layers 70 of wire mesh screen, the layers 72 of steel wool, and the layers 74 of ceramic/glass wool in substantially cylindrical configurations extending circumferentially around the cylindrical inner wall member 50. The layers 70, 72 and 74 are assembled into the configurations shown in FIG. 4 by laying out a sheet 120 of ceramic/glass wool and a sheet 122 of steel wool in overlying relationship with a sheet 124 of wire mesh screen. The overlying sheets 120, 122 and 124 are then wound around the inner wall member 50 in spirals which define the substantially cylindrical layers 74, 72 and 70, respectively.

When the filter assembly 56 is in the partially assembled condition shown in FIG. 4, the sheet 124 of wire mesh screen has a radially outer end portion 126. The radially outer end portion 126 preferably extends beyond the radially outer end portions 128 and 130 of the other sheets 120 and 122 of filter material. The plenum screen 76 has a first end portion 140 and a second end portion 142. The end portion 126 of the sheet 120 of wire mesh screen is welded to the first end portion 140 of the plenum screen 76. When the filter assembly 56 is further wound in the counterclockwise direction as viewed in FIG. 4, the plenum screen 76 is wrapped circumferentially around the outermost layer 70 of wire mesh screen. The plenum screen 76 then extends circumferentially entirely around the outermost layer 70 as described above with reference to FIG. 3. The second end portion 142 of the plenum screen 76 is then welded to the outermost layer 70 of wire mesh screen. Alternatively, the plenum screen 76 could be circumferentially long enough for the second end portion 142 to overlap the first end portion 140, in which case the second end portion 142 would be welded to the first end portion 140. The filter assembly 56 and the inner wall member 50 are thus assembled as a cylindrical unit 150, as identified by the bracket in FIG. 3.

Figure 3:
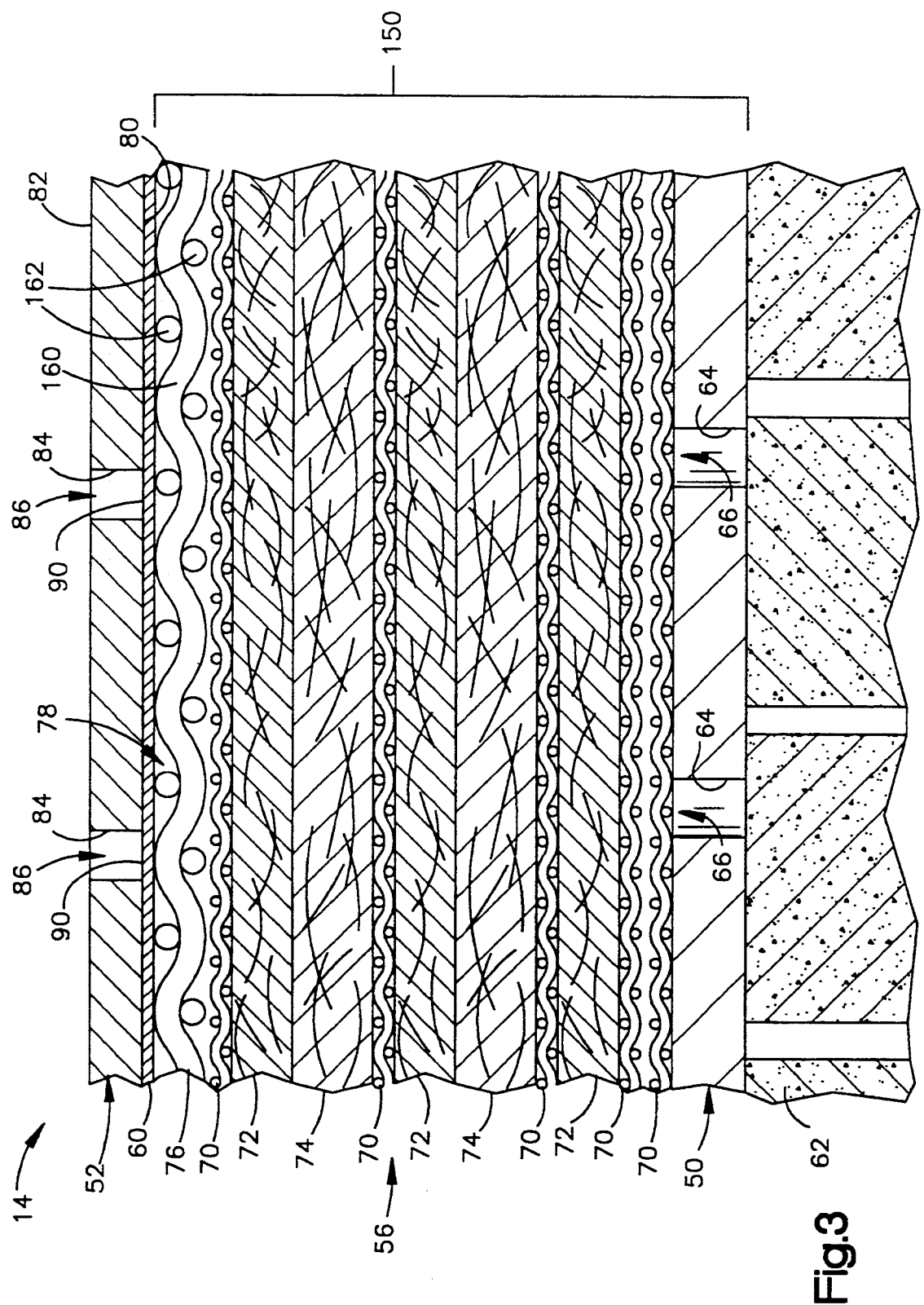
FIG. 3 is a partial sectional view of parts of the apparatus of FIG. 1.
Figure 5:
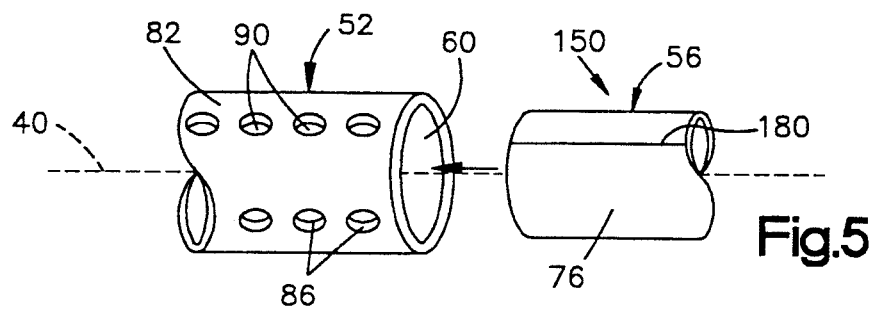
FIG. 5 is a schematic view of parts of the apparatus of FIG. 1 being assembled.

The cylindrical unit 150 is installed in the position shown in FIG. 3 by sliding the cylindrical unit 150 telescopically into the space within the outer wall member 52 through an open end of the outer wall member 52, as shown schematically in FIG. 5. When the unit 150 is thus being moved axially relative to the outer wall member 52, the plenum screen 76 is moved axially in sliding contact with the pressure controlling member 60, which is previously installed against the inner surface 80 of the outer wall member 52.

Figure 6:
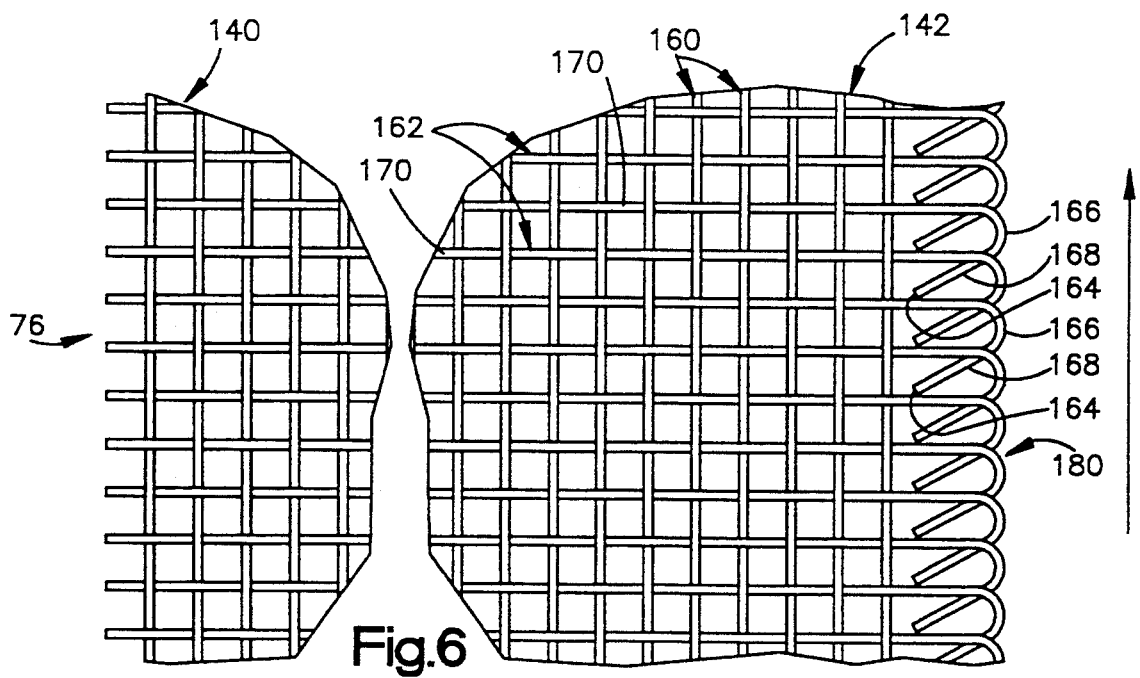
FIG. 6 is an enlarged view of a part of the apparatus of FIG. 1.

As shown in enlarged detail in FIG. 6, the plenum screen 76 is formed of a plurality of first and second woven wire strands 160 and 162. The strands 160 and 162 preferably have circular cross sections. Each of the second strands 162 has a terminal end 164 at the second end portion 142 of the plenum screen 76. Before the plenum screen 76 is wrapped circumferentially into the filter assembly 56 as described above, each of the second strands 162 is bent at the second end portion 142 of the plenum screen 76 to form an arcuate end surface 166 and a terminal end section 168. As shown in FIG. 6, the second strands 162 are preferably bent at an angle between 90° to 180° so that the terminal end sections 168 extend back from the arcuate end surfaces 166 toward the first end portion 140 of the plenum screen 76. Each of the terminal end sections 168 thus forms an acute angle with the major portion 170 of the respective strand 162. Moreover, the second strands 162 form an edge 180 of the plenum screen 76 at the second end portion 142 of the plenum screen 76. The edge 180 is thus formed as a selvage having no projecting sharp portions, with each of the arcuate end surfaces 166 defining a portion of the edge 180, and with each of the terminal ends 164 being spaced inward from the edge 180.

When the plenum screen 76 is wound circumferentially into the cylindrical filter assembly 56 as described above, the first strands 160 extend generally parallel to the axis 40, and the second strands 162 extend circumferentially around the axis 40. Each of the arcuate end surfaces 166 then defines the circumferential terminus of the respective second strand 162, and the selvage at the edge 180 extends axially along the length of the cylindrical filter assembly 56, as shown in FIG. 5.

When the plenum screen 76 is moved in sliding contact with the pressure controlling member 60 upon movement of the cylindrical unit 150 telescopically into the outer wall member 52, the arcuate end surfaces 166 defining the selvage at the edge 180 have a minimal tendency to tear or puncture the pressure controlling member 60. The terminal ends 164, which have sharp edges, are preferably located so as to trail the arcuate end surfaces 166 as the plenum screen 76 slides against the pressure controlling member 60 in the direction of the arrow shown in FIG. 6. The terminal ends 164 are most preferably located radially inward of the arcuate end surfaces 166, as shown in FIG. 6, so that the sharp edges of the terminal ends 164 do not contact the pressure controlling member 60.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for inflating a vehicle occupant restraint, such as an air bag, said apparatus comprising:
    a source of gas for inflating the vehicle occupant restraint;
    a tubular wall with a plurality of gas flow openings for directing said gas to flow from the inside of said tubular wall to the outside of said tubular wall;
    a sheet of rupturable pressure controlling material extending circumferentially around the inside of said tubular wall and across said gas flow openings, said sheet of rupturable pressure controlling material blocking said gas from flowing into said gas flow openings; and
    a cylindrical filter assembly located within said tubular wall between said source of gas and said sheet of rupturable pressure controlling material, said filter assembly comprising a woven mesh plenum screen extending circumferentially around the inside of said sheet of rupturable pressure controlling material, said woven mesh plenum screen having an end edge extending axially along the length of said cylindrical filter assembly, said end edge adjoining said sheet of rupturable pressure controlling material;
    said end edge of said woven mesh plenum screen being a selvage comprising means for minimizing the tendency of said woven mesh plenum screen to rupture said sheet of rupturable pressure controlling material where said end edge adjoins said sheet of rupturable pressure controlling material.

2. A method of assembling an apparatus for inflating a vehicle occupant restraint such as an air bag, the apparatus including a source of gas for inflating the vehicle occupant restraint, a cylindrical tubular wall having an open end and a plurality of gas flow openings for directing the gas to flow from the inside of the cylindrical tubular wall to the outside of the cylindrical tubular wall, a sheet of rupturable pressure controlling material, and a cylindrical filter assembly with a cylindrical outer surface, the cylindrical filter assembly including a woven mesh plenum screen having an end edge, said method comprising the steps of:

installing said sheet of rupturable pressure controlling material within said cylindrical tubular wall in a position extending circumferentially around the inside of said cylindrical tubular wall and across said gas flow openings;

providing said woven mesh plenum screen with a selvage at said end edge;

assembling said cylindrical filter assembly at a location outside said cylindrical tubular wall, including forming said woven mesh plenum screen into a substantially cylindrical configuration with said end edge extending axially along the length of said cylindrical filter assembly at said cylindrical outer surface of said cylindrical filter assembly; and moving said cylindrical filter assembly coaxially through said open end of said cylindrical tubular wall and into a position within said cylindrical tubular wall in which said woven mesh plenum screen adjoins said sheet of rupturable pressure controlling material, said woven mesh plenum screen being moved in sliding contact with said sheet of rupturable pressure controlling material upon movement of said cylindrical filter assembly through said open end of said cylindrical tubular wall.

3. A method as defined in claim 2 wherein said woven mesh plenum screen has a first end portion and a second end portion, said second end portion including said edge, said step of assembling said cylindrical filter assembly including the step of winding a sheet of filter screen material into a spiral configuration in which said sheet of filter screen material defines a plurality of substantially cylindrical layers of filter screen material and has a radially outer end portion, said step of assembling said cylindrical filter assembly further including the step of welding said first end portion of said woven mesh plenum screen to said radially outer end portion of said sheet of filter screen material.

4. A method as defined in claim 2 wherein said woven mesh plenum screen comprises woven strands including a plurality of strands forming said edge, said step of providing said woven mesh plenum screen with a selvage at said edge including the steps of bending each of said plurality of strands into a configuration defining an arcuate end surface which forms a portion of said edge.

5. A method as defined in claim 4 wherein said bending steps bend each of said plurality of strands into a configuration having a terminal end spaced radially inward from said edge.

6. Apparatus for inflating a vehicle occupant restraint such as an air bag, said apparatus comprising:

a source of gas for inflating the vehicle occupant restraint;

a tubular wall with a plurality of gas flow openings for directing said gas to flow from the inside of said tubular wall to the outside of said tubular wall;

a sheet of rupturable pressure controlling material extending circumferentially around the inside of said tubular wall and across said gas flow openings, said sheet of rupturable pressure controlling material blocking said gas from flowing into said gas flow openings; and a cylindrical filter assembly located within said tubular wall between said source of gas and said sheet of rupturable pressure controlling material, said filter assembly comprising a woven mesh plenum screen extending circumferentially around the inside of said sheet of rupturable pressure controlling material, said woven mesh plenum screen having an edge adjoining said sheet of rupturable pressure controlling material;

said edge of said woven mesh plenum screen being a selvage comprising means for minimizing the tendency of said woven mesh plenum screen to rupture said sheet of rupturable pressure controlling material where said edge adjoins said sheet of rupturable pressure controlling material;

said woven mesh plenum screen comprising a plurality of woven strands including strands extending circumferentially around the inside of said sheet of rupturable pressure controlling material, each of said circumferentially extending strands having an arcuate end surface defining the circumferential terminus of the respective strand, said selvage being defined by said arcuate end surfaces.

7. Apparatus as defined in claim 6 wherein each of said circumferentially extending strands has a terminal end section adjoining said selvage, each of said terminal end sections extending radially inward from said selvage and having a terminal end spaced radially inward from said selvage.

8. Apparatus as defined in claim 7 wherein said woven mesh plenum screen has a first end portion and a second end portion, said second end portion including said selvage, said woven mesh plenum screen extending circumferentially in a first direction from said first end portion to said second end portion, said terminal end sections of said circumferentially extending strands extending from said selvage in a second direction which is at an angle from 90° to 180° relative to said first direction.

9. A method of assembling an apparatus for inflating a vehicle occupant restraint such as an air bag, the apparatus including a source of gas for inflating the vehicle occupant restraint, a tubular wall having an open end and a plurality of gas flow openings for directing the gas to flow from the inside of the tubular wall to the outside of the tubular wall, a sheet of rupturable pressure controlling material, and a cylindrical filter assembly, the cylindrical filter assembly including a woven mesh plenum screen having an edge, said method comprising the steps of:

installing said sheet of rupturable pressure controlling material within said tubular wall in a position extending circumferentially around the inside of said tubular wall and across said gas flow openings;

providing said woven mesh plenum screen with a selvage at said edge;

assembling said cylindrical filter assembly at a location outside said tubular wall, including forming said woven mesh plenum screen into a substantially cylindrical configuration; and moving said cylindrical filter assembly through said open end of said tubular wall and into a position within said tubular wall inc which said woven mesh plenum screen adjoins said sheet of rupturable pressure controlling material, said woven mesh plenum screen being moved in sliding contact with said sheet of rupturable pressure controlling material upon movement of said cylindrical filter assembly into said tubular wall;

said woven mesh plenum screen comprising woven strands including a plurality of strands forming said edge, said step of providing said woven mesh plenum screen with a selvage at said edge including the steps of bending each of said plurality of strands into a configuration defining an arcuate end surface which forms a portion of said edge;

said bending steps bending each of said plurality of strands into a configuration having a terminal end spaced radially inward from said edge;

said woven mesh plenum screen having a first end portion and a second end portion, said second end portion including said edge, each of said plurality of strands extending circumferentially in a first direction from said first end portion to said second end portion when said woven mesh plenum screen is in said substantially cylindrical configuration, said bending steps bending each of said plurality of strands into a configuration defining a terminal end section of the respective strand, said terminal end sections extending from said arcuate end surfaces in a second direction which is at an angle from 90° to 180° relative to said first direction.

10. A method as defined in claim 9 wherein said step of assembling said cylindrical filter assembly includes the step of winding a sheet of filter screen material into a spiral configuration in which said sheet of filter screen material defines a plurality of substantially cylindrical layers of filter screen material and has a radially outer end portion, said step of assembling said cylindrical filter assembly further including the step of welding said first end portion of said woven mesh plenum screen to said radially outer end portion of said sheet of filter screen material.

* * * * *